US010289391B2

(12) United States Patent
Ban et al.

(10) Patent No.: US 10,289,391 B2
(45) Date of Patent: *May 14, 2019

(54) OPTIMIZATION OF SOFTWARE SYMBOL TABLES

(71) Applicant: International Business Machines Corporation, Armonk, NY (US)

(72) Inventors: Huai Yun Ban, Nan jing (CN); JiuFu Guo, Pudong New District Shang (CN); Jinsong Ji, Ponte Vedra, FL (US); Si Yuan Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,822

(22) Filed: Jan. 4, 2016

(65) Prior Publication Data

US 2016/0117156 A1    Apr. 28, 2016

Related U.S. Application Data

(63) Continuation of application No. 14/656,818, filed on Mar. 13, 2015, now Pat. No. 9,235,391.

(30) Foreign Application Priority Data

Mar. 31, 2014    (CN) .......................... 2014 1 0126197

(51) Int. Cl.
*G06F 9/44*    (2018.01)
*G06F 8/41*    (2018.01)

(52) U.S. Cl.
CPC ............ *G06F 8/443* (2013.01); *G06F 8/4441* (2013.01)

(58) Field of Classification Search
CPC ................................ G06F 8/443; G06F 8/4441
(Continued)

(56) References Cited

U.S. PATENT DOCUMENTS 5,175,856 A * 12/1992 Van Dyke ................ G06F 8/41
711/E12.006
5,923,882 A    7/1999 Ho et al.
(Continued)

OTHER PUBLICATIONS

Ban et al., China Patent Application 201410126197.3 (English Translation), "Method and Apparatus for Optimizing Software", filed Mar. 31, 2014.
(Continued)

*Primary Examiner* — Anna C Deng
(74) *Attorney, Agent, or Firm* — James H. Mayfield; David S. Richart; Jose A. Medina-Cruz (57) ABSTRACT

A method, apparatus, and computer program product for optimizing software are provided. The software includes a plurality of modules which include at least one controllable module, the method comprises: determining a shared symbol defined by the at least one controllable module, the shared symbol being a symbol used by two or more modules of the software; generating a symbol use file indicating the shared symbol defined by the at least one controllable module; and rebuilding the software based on the symbol use file, so that a symbol table in a controllable module of the rebuilt software only contains the shared symbol indicated in the symbol use file. A number of symbols in the symbol table can be reduced accurately and effectively, thereby time needed for loading the symbol table can be reduced and software execution efficiency can be improved.

5 Claims, 3 Drawing Sheets (58) Field of Classification Search
USPC .......................................................... 717/101
See application file for complete search history.

(56) References Cited

U.S. PATENT DOCUMENTS

| | | | |
|---|---|---|---|
| 7,065,754 | B1 | 6/2006 | Coutant et al. |
| 2005/0028151 | A1* | 2/2005 | Roth ........................ G06F 8/447 |
| | | | 717/162 |
| 2005/0076344 | A1* | 4/2005 | Goring ................ G06F 9/45508 |
| | | | 719/320 |
| 2005/0160058 | A1 | 7/2005 | Li et al. |
| 2005/0246689 | A1 | 11/2005 | Radhakrishnan et al. |
| 2011/0271148 | A1 | 11/2011 | Eigler et al. |
| 2011/0289483 | A1 | 11/2011 | Williams et al. |

OTHER PUBLICATIONS

Drepper, Ulrich, "How to Write Shared Libraries", Dec. 10, 2011, pp. 1-47, Copyright © 2002-2010, 2011 Ulrich Drepper, <http://www.akkadia.org/drepper/dsoshowto.pdf>.

Mandalika, Giri, "Reducing Symbol Scope with Sun Studio C/C++", May 2005 (revised Mar. 22, 2006), Oracle, <http.www.oracle.com/technetwork/server-storage/solaris10/symbol-scope-140496.html>.

'Ban et al., "Optimization of Software Symbol Tables", USPTO U.S. Appl. No. 14/656,818, filed Mar. 13, 2015, pp. 1-36.

IBM Appendix P, list of patents and patent applications to be treated as related, Jan. 4, 2016, pp. 1-2.

* cited by examiner

OPTIMIZATION OF SOFTWARE SYMBOL TABLES

BACKGROUND OF THE INVENTION

The present disclosure relates to software optimization, and more particularly, to a method, apparatus, and computer program product for optimizing software symbol tables.

Software may include several modules, such as an executable file and a library which the executable file needs to invoke. Each module may include a number of symbols, e.g., functions and/or variables, which may include symbols defined by the module itself and used only by the module (which may be referred to as internal symbols hereinafter), symbols defined by the module itself and used by two or more modules and symbols defined by another module and used by two or more modules (the latter two types of symbols may be referred to as shared symbols hereinafter). Generally, a symbol table is established in each module to store all symbols in the module and information associated with the symbols, such as types of the symbols, absolute addresses and offsets of the symbols for positioning the symbols, and the like. When the module runs, the symbol table can be loaded, and a corresponding operation may be executed according to the symbols and the related information in the symbol table.

As the software becomes bigger and bigger, there are more and more symbols and related information in the symbol table, making the symbol table increasingly large. This leads to more time consumed to load and parse the symbol table when the software is executed, and thus reduces software execution efficiency. Conventionally, such a problem can be solved by two methods. In a first conventional method, a developer of the software manually analyzes source files of the respective modules of the software to identify all the shared symbols in the software, compiles an export file in which the shared symbols are labeled as "export", and then provides the export file for a linker which hides the internal symbols in the symbol table of the module according to the export file. However, as the source files of the software are often very big in size, the operation of manually identifying all the shared symbols is very difficult and time-consuming, and is easy to cause omission. In addition, in the software (which, for example, is based on a C++ language), names of the symbols and the like may change during compiling and linking, rendering the method difficult to implement. In a second conventional method, the developer of the software modifies the source file of each module to add to the symbols in the module visibility labels indicating whether the symbols should be hidden, then the linker determines whether to hide the symbols in the symbol table according to the visibility labels of the symbols. This method requires modification of the source file, which would introduce additional risks, and when the software is updated, the labels of the respective symbols need to be updated accordingly, which is troublesome.

SUMMARY

To solve the above problem, an object of the present disclosure is to provide a method, apparatus, and computer program product for optimizing software, which can reduce a size of a symbol table accurately and effectively, thereby reducing time for loading the symbol table and improving software execution efficiency.

According to an aspect of the present disclosure, there is provided a method for optimizing software including a plurality of modules which include at least one controllable module, the method comprising: determining a shared symbol defined by the at least one controllable module, the shared symbol being a symbol used by two or more modules of the software; generating a symbol use file indicating the shared symbol defined by the at least one controllable module; and rebuilding the software based on the symbol use file, so that a symbol table in a controllable module of the rebuilt software only contains the shared symbol indicated in the symbol use file.

According to another aspect of the present disclosure, there is provided an apparatus for optimizing software including a plurality of modules which include at least one controllable module, the apparatus comprising: a determining device, configured to determine a shared symbol defined by the at least one controllable module, the shared symbol being a symbol used by two or more modules of the software; a generating device, configured to generate a symbol use file indicating the shared symbol defined by the at least one controllable module; and a building device, configured to rebuild the software based on the symbol use file, so that a symbol table in a controllable module of the rebuilt software only contains the shared symbol indicated in the symbol use file.

According to another aspect of the present disclosure, there is provided a computer program product for optimizing software including a plurality of modules which include at least one controllable module, the method comprising: determining a shared symbol defined by the at least one controllable module, the shared symbol being a symbol used by two or more modules of the software; generating a symbol use file indicating the shared symbol defined by the at least one controllable module; and rebuilding the software based on the symbol use file, so that a symbol table in a controllable module of the rebuilt software only contains the shared symbol indicated in the symbol use file.

With the method, apparatus, and computer program product according to the above-described aspects of the present disclosure, the usage status of the respective symbols in the controllable module of the software can be automatically analyzed, and the software may be rebuilt based on the analysis result, so that the symbol table in the controllable module of the rebuilt software only contains the shared symbol which is shared by a plurality of modules of the software. Thus, the number of symbols in the symbol table can be reduced accurately and effectively, the time consumed to load and parse the symbol table during the execution of the software can be shortened, and the software execution efficiency can be improved.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

With reference now to the accompanying drawings, a method, apparatus, and computer program product according to embodiments of the present disclosure will be described below.

Figure 1:
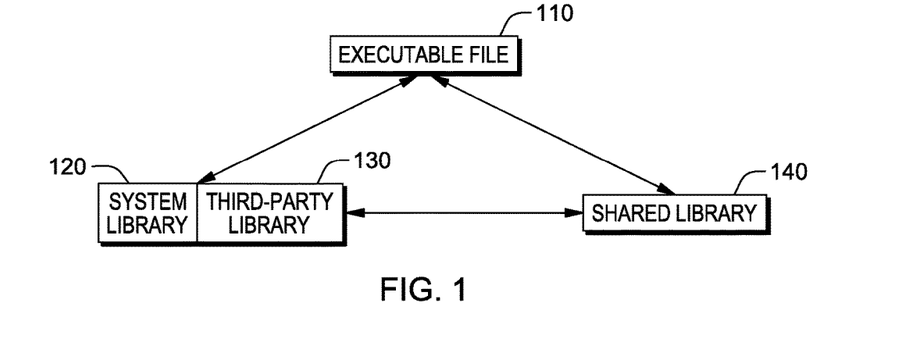
FIG. 1 schematically shows architecture of software including a plurality of modules.

When writing software, a developer firstly writes a source file (source codes), and then compile the source files by a compiler to generate an object file. Next, the object file and a library to be invoked are linked together by a linker, to generate an executable file or a shared library. The library to be invoked can include a shared library developed by the developer in advance in the above-described manner, a library developed by a third party, and/or a system library. The executable file and the library can be called modules, because the executable file and the shared library are developed by the developer himself, in other words, the developer can control the executable file and the shared library by modifying the source file, the executable file and the shared library (as well as other modules developed by the developer himself) may be called controllable modules; on the contrary, because the developer usually cannot modify the third-party library and the system library, the third-party library and the system library may be called uncontrollable modules. Of course, in other embodiments, the third-party library and the system library which are not developed by the developer himself but of which source codes can be obtained and modified by the developer may also be called controllable modules. FIG. 1 schematically shows architecture of the software. As shown by arrows in FIG. 1 (module 100), during execution of the software, the executable file (110) and the shared library (140) which are the controllable modules and the third-party library (130) and the system library (120) which are uncontrollable modules may invoke each other, thereby executing corresponding operations.

As described above, each module of the software may define a plurality of symbols, a part of these symbols (i.e., internal symbols) are merely used inside the module, and another part of these symbols (i.e., shared symbols) may be used by the module and other modules. In the embodiment of the present disclosure, the symbols defined by the respective controllable modules of the software may be automatically analyzed in order to determine the shared symbols, and the software is rebuilt according to the determined shared symbols, so that symbol tables in the respective controllable modules of the software merely contain the shared symbols, thereby reducing sizes of the symbol tables, and improves software execution efficiency.

Figure 2:
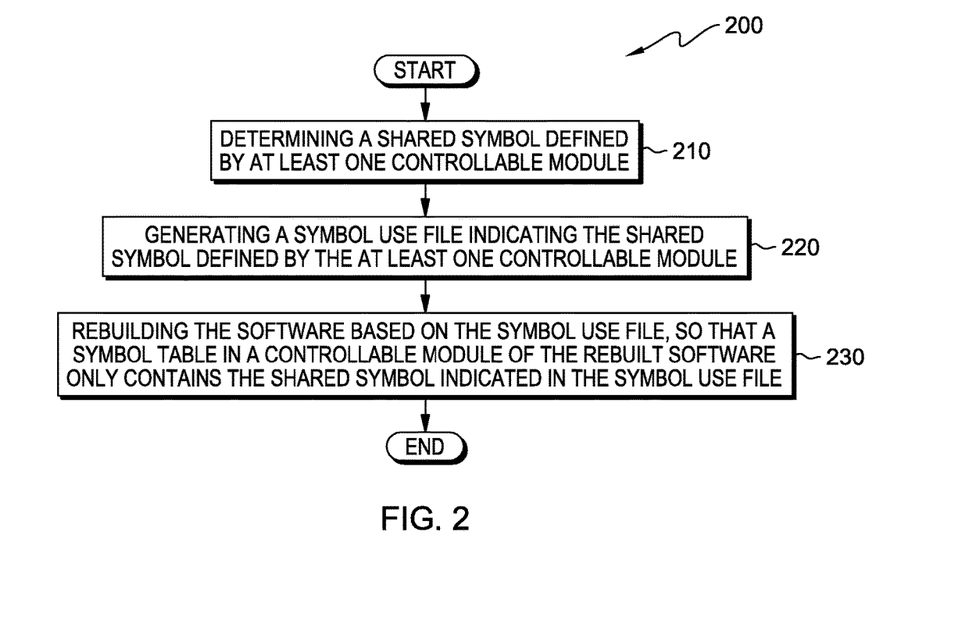
FIG. 2 shows a flowchart of a method for optimizing software according to an embodiment of the present disclosure.

With reference now to FIG. 2 (method 200), the method for optimizing software according to the embodiment of the present disclosure will be described in more detail. The software may include a plurality of modules which include at least one controllable module. As shown in FIG. 2, in step 210, a shared symbol defined by the at least one controllable module is determined. As mentioned above, the shared symbol is a symbol used by two or more modules of the software. In the embodiment of the present disclosure, the respective modules of the software may be automatically analyzed to identify all shared symbols defined by the at least one controllable module.

Specifically, usage status of symbols defined by each controllable module in the at least one controllable module may be analyzed, i.e., it may be analyzed whether the symbols defined by each controllable module in the at least one controllable module are used by the each controllable module and two or more of modules (which may include a controllable module and/or an uncontrollable module) invoked by the each controllable module, so as to determine whether the symbols defined by the each controllable module are shared symbols. For example, the usage status of the symbols defined by the each controllable module in the at least one controllable module may be determined by performing an Interprocedural Analysis (IPA) on the each controllable module and other modules invoked by the each controllable module. For example, for each symbol defined by an executable file which is a controllable module, it may be determined whether the symbol is used by the executable file and two or more modules in a library invoked by the executable file by the IPA, so as to determine whether the symbol is the shared symbol. The method for performing the IPA is commonly known in the art, and a description thereof is omitted here.

In step 220, a symbol use file indicating the shared symbol defined by the at least one controllable module is generated. Besides indication of the shared symbol defined by the at least one controllable module, the symbol use file may include information indicating the controllable module which defines the shared symbol and information indicating the modules which use the shared symbol.

Specifically, for each controllable module in the at least one controllable module, a symbol use file (hereinafter referred to as module symbol use file) indicating the shared symbol defined by the each controllable module and other controllable module invoked by the each controllable module may be generated based on the determination result in step 210. Then, module symbol use files generated for all of the at least one controllable module can be merged to generate a symbol use file (hereinafter referred to a total symbol use file) indicating all the shared symbols defined by the at least one controllable module. The module symbol use file and the total symbol use file may adopt any appropriate format, such as table, text files, etc. Specifically, information related to the same shared symbol (such as information indicating the modules which use the shared symbol) in the respective module symbol use files may be merged so as to merge the respective module symbol use files. For example, it is assumed that the software includes two controllable modules, and module symbol use files shown in Table 1 and Table 2 are generated for the two controllable modules respectively:

TABLE 1

| Symbol | Def | Ref |
|---|---|---|
| sym1 | mod1 | mod1, mod2 |
| sym2 | mod2 | mod1 |
| sym3 | mod2 | mod2 |

TABLE 2

| Symbol | Def | Ref |
|---|---|---|
| sym1 | mod1 | mod1 |
| sym2 | mod2 | mod2, mod1 |
| sym3 | mod2 | mod2 |

As an example, each module use file may include three fields, i.e., "Symbol", "Def" and "Ref", where the field "Symbol" indicates the symbols defined by the controllable module and other controllable modules invoked by the controllable module, the field "Def" indicates the controllable modules which define the symbols, the field "Ref" indicates the modules (which may include the controllable modules and the uncontrollable modules) which use the symbols, sym1, sym2 and sym3 represent the symbols, and mod 1 and mod 2 represent the controllable modules. By merging the two module symbol use files, specifically, by merging the "Ref" field corresponding to the same symbol, a total symbol use file shown in Table 3 below may be obtained.

TABLE 3

| Symbol | Def | Ref |
|---|---|---|
| sym1 | mod1 | mod1, mod2 |
| sym2 | mod2 | mod2, mod1 |
| sym3 | mod2 | mod2 |

In the total symbol use file shown in Table 3, it may be identified whether each symbol is the shared symbol by the "Ref" field.

Figure 3:
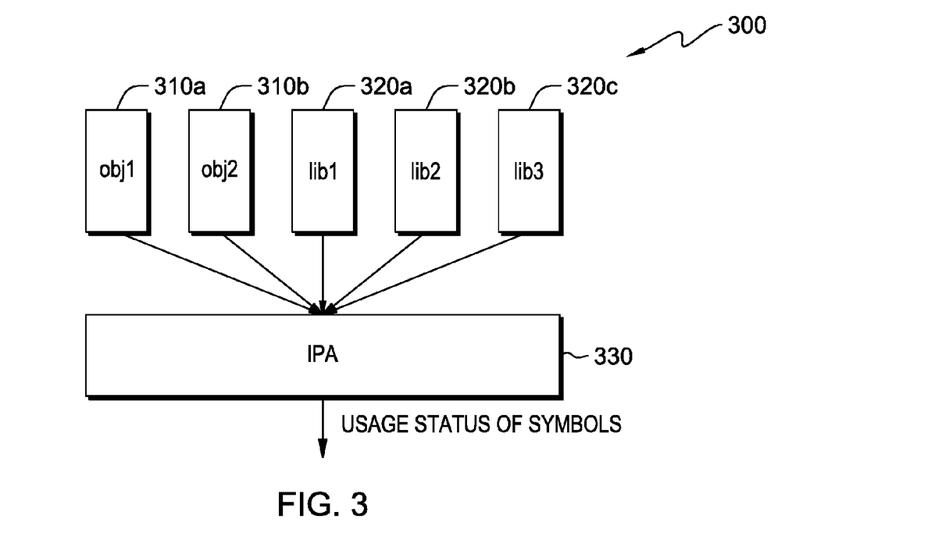
FIG. 3 schematically shows a process of generating a module symbol use file for a controllable module.

Specific operations of steps 210 and 220 are described exemplarily below in conjunction with FIG. 3. The example of FIG. 3 shows four modules (module 300), i.e. an executable file exe1 (not shown) and shared libraries lib1 (320a) and lib2 (320b) developed by the developer himself, and a third-party library lib3 (320c), where the executable file exe1 is generated by using two object files (i.e., an object file obj1 (310a) and an object file obj2 (310b)) and invokes the shared libraries lib1 (320a) and lib2 (320b) and the third-party library lib3 (320c). It can be known from the above description that the executable exe1 (the object file obj1 (310a) and the object file obj2 (310b)) and the shared libraries lib1 (320a) and lib2 (320b) are controllable modules, and the third-party library lib3 (320c) is an uncontrolled module. Furthermore, it is assumed that the object file obj1 (310a) to which the executable file exe1 corresponds defines two functions fun1 and s_fun1 and one variable var1, the object file obj2 (310b) to which the executable file exe1 corresponds defines two functions fun2 and s_fun2 and one variable var2, the shared library lib1 defines functions 1_fun1 and 1_s_fun1 and one variable 1_var1, the shared library lib2 defines functions 1_fun2 and 1_s_fun2 and one variable 1_var2, and the third-party library lib3 defines functions 1_fun3 and 1_s_fun3 and one variable, 1_var3.

In step 210, the usage status of the respective symbols defined by the respective controllable modules (the executable file exe1 and the shared libraries lib1 and lib2) may be analyzed by for example the IPA (330) in the above-described manner, in order to determine the shared symbols defined by the respective controllable modules, where the symbols defined by the executable file exe1 can be determined by analyzing the object file obj1 and the object file obj2 of the executable file exe1. Here, assume that it can be determined by the IPA that the functions 1_fun1 and 1_s_fun1 are only used by lib1, the variables 1_var1 and 1_var2 as well as the function 1_fun2 are used by lib1 and lib2, the function 1_s_fun2 is only used by lib2, the functions_fun1 and fun2 are used by exe1, lib1 and lib3, and the variables var1 and var2 as well as the functions s_fun1 and s_fun2 are used by exe1.

Then, in step 220, the module symbol use file indicating the shared symbols defined by the executable file exe1 and the controllable modules (i.e., the shared libraries lib1 and lib2) invoked by the executable file exe1 can be generated for the executable file exe1. In this example, a table as shown in Table 4 below can be generated as the module symbol use file. As described above, the table may include three fields "Symbol", "Def" and "Ref", where the field "Symbol" indicates the symbols defined by the executable file exe1 and the shared libraries lib1 and lib2 invoked by the executable file exe1, the field "Def" indicates the controllable modules which define the symbols, and the field "Ref" represents the modules which use the symbols.

TABLE 4

| Symbol | Def | Ref |
|---|---|---|
| l_fun1 | lib1 | lib1 |
| l_var1 | lib1 | lib1, lib2 |
| l_s_fun1 | lib1 | lib1 |
| l_fun2 | lib2 | lib1, lib2 |
| l_var2 | lib2 | lib2, lib1 |
| l_s_fun2 | lib2 | lib2 |
| fun1 | exe1 | exe1, lib1, lib3 |
| var1 | exe1 | exe1 |
| s_fun1 | exe1 | exe1 |
| fun2 | exe1 | exe1, lib1, lib 3 |
| var2 | exe1 | exe1 |
| s_fun1 | exe1 | exe1 |

In a similar manner, for each controllable module of the software, the module symbol use file indicating the shared symbols defined by the controllable module and other controllable modules invoked by the controllable module may be generated. Then, as described above, the module symbol use files generated for the respective controllable modules are merged to generate a total symbol use file indicating all the shared symbols in the at least one controllable module.

Returning to FIG. 2, in step 230, the software is rebuilt based on the total symbol use file, so that a symbol table in a controllable module of the rebuilt software only contains the shared symbols indicated in the total symbol use file. As for the internal symbols, because they are only used inside the controllable modules which define them, they can be directly used in the controllable modules when necessary, instead of being stored in the symbol table.

Specifically, a source file of each controllable module of the software may be re-compiled to generate a corresponding object file, in which symbols (i.e., the internal symbols) in the each controllable module, other than the shared symbols indicated in the total symbol use file, are provided with an access mode quicker than that of the shared symbols. More specifically, because the shared symbols in each controllable module are used by a plurality of modules, it is necessary to provide addressing information of the shared symbols in the object file of the controllable module, and to set an access mode of the shared symbols so that the controllable module can position and load (access) the shared symbols according to the addressing information. For the internal symbols in each controllable module, because they are only used by the controllable module itself, the addressing information may not be set in the object file of the controllable module, and instead the access mode of the internal symbols is set so that the controllable module can directly load (access) the internal symbols, thus obtaining an access speed quicker than that of the shared symbols. For example, the total symbol use file can be fed to a compiler. During compiling the source files of the respective controllable modules of the software, the compiler may inquire the total symbol use file to determine the shared symbols (and the internal symbols) in the respective controllable modules, and then, in the object files generated by compiling, set a quick access mode for the internal symbols in the respective controllable module and set a conventional access mode (a slow access mode) for the shared symbols. In this way, the object files generated for the respective controllable modules may be optimized.

Then, the optimized object files and the total symbol use file may be fed to the linker. The linker inquires the total symbol use file to determine the shared symbols (and the internal symbols) in the respective controllable modules, and when the object files are re-linked to generate controllable modules (executable files or shared libraries) in the rebuilt software which correspond to the above respective controllable modules respectively, the internal symbols are hidden in the symbol tables in the corresponding controllable modules, that is, the internal symbols are not generated into the symbol tables in the controllable modules in the rebuilt software, so that the symbol tables contain only the shared symbols indicated in the total symbol use file.

Thus, the rebuilt software, instead of the original software, can be executed when necessary. It can be seen that by using the method for optimizing the software according to the embodiment of the present disclosure, the respective controllable modules of the software can be analyzed automatically to determine the usage status of the respective symbols defined thereby. This, as compared with the conventional method of manually analyzing the usage status, reduces the burden on the developer of the software significantly. Furthermore, the method can accurately identify the internal symbols in the software and reduce the number of symbols in the symbol tables, thereby reducing the time consumed to load and parse the symbol tables when the software runs and improving the software execution efficiency. Further, as the internal symbols are hidden in the symbol tables of the respective controllable modules in the rebuilt software, implementation details of the software can be prevented from being exposed to the external, which improves security of the software.

It is be appreciated that the above method for optimizing the software is only illustrative, instead of limitative. Those skilled in the art can make various modifications thereto without departing from the scope of the present disclosure. For example, although it is described in the above description regarding step 230 that the entire total symbol use file is fed to the compiler and the linker to rebuild the software, this is not limitative, and the total symbol use file can also be divided into a plurality of sub-files according to the modules which define the respective symbols (e.g., the modules indicated in the "Def" field in the above Table 4). Then, when each controllable module is re-compiled and linked, the sub-file to which the controllable module corresponds is fed to the compiler and the linker, so that the compiler and the linker may perform compiling and linking only based on the sub-file. For example, the total symbol use file as shown in the above Table 3 may be divided into two sub-files as shown in Table 5 and Table 6 below, according to the modules which define the respective symbols.

TABLE 5

| Symbol | Def | Ref |
|--------|------|-------------|
| sym1 | mod1 | mod1, mod2 |

TABLE 6

| Symbol | Def | Ref |
|--------|------|-------------|
| sym2 | mod2 | mod2, mod1 |
| sym3 | mod2 | mod2 |

Then, when a controllable module 1 (mod 1) is re-compiled and linked, the sub-file as shown in Table 5 can be fed to the compiler and the linker, and when a controllable module 2 (mod 2) is re-compiled and linked, the sub-file as shown in Table 6 may be fed to the compiler and the linker. Thus, because the number of symbols contained in the sub-files received by the compiler and the linker decreases, the time consumed to load and parse the sub-files can be reduced.

Furthermore, the above method for optimizing the software according to the embodiment of the present disclosure can be used in combination with the two conventional methods described above. For example, after the total symbol use file is generated by using the method for optimizing the software according to the embodiment of the present disclosure, an export file written by the developer himself can be merged into the total symbol use file according to a predetermined merging rule, then the software is rebuilt by the merged total symbol use file. The merging rule may be, for example: if a symbol is labeled as "export" in the export file, then no matter whether the symbol is labeled as the shared symbol in the total symbol use file before the merging, the symbol is labeled as the shared symbol in the merged total symbol use file. For example, the labeling can be performed by adding a corresponding label in the field "Ref" in the merged total symbol use file. In this way, the developer of the software can flexibly control whether to export the symbols in the software by writing the export file.

The respective embodiments for implementing the method of the present disclosure have been described above with reference to the accompanying drawings. Those skilled in the art may understand that the above method may be implemented in software, in hardware, or in a combination thereof. Further, those skilled in the art may understand that by implementing the respective steps in the above method in software, in hardware, or in a combination thereof, an apparatus for optimizing software based on the same inventive concept may be provided. Even if a hardware configuration of the apparatus is the same as that of a general-purpose processing apparatus, the apparatus will exhibit characteristics different from the general-purpose processing apparatus due to a function of software contained therein, so as to form the apparatus according to the embodiment of the present disclosure. The apparatus of the present disclosure comprises a plurality of units or modules, which are configured to execute corresponding steps. Those skilled in the art may understand how to write a program to implement actions of the units or modules by reading the present specification. Hereinafter, the apparatus for optimizing software according to the embodiment of the present disclosure will be described specifically with reference to FIG. 4. Because the apparatus and the method are based on the same inventive concept, the same or corresponding implementation details in the above method are also applicable to the apparatus corresponding to the above method, and these implementation details will not be described below because they have been described in the above in detail and completely.

Figure 4:
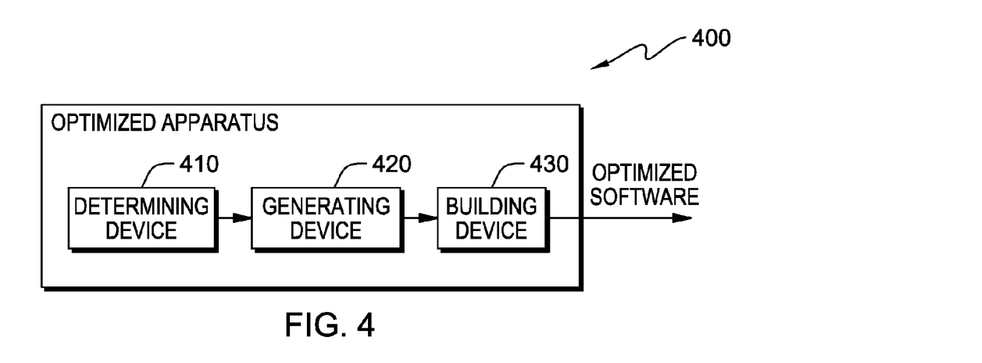
FIG. 4 shows a block diagram of an apparatus for optimizing software according to an embodiment of the present disclosure.

As shown in FIG. 4, the apparatus 400 for optimizing software (hereinafter referred to optimizing apparatus) according to the embodiment of the present disclosure can include a determining device 410, a generating device 420 and a building device 430.

The determining device 410 can determine a shared symbol defined by the at least one controllable module. As described above, the shared symbol is a symbol used by two or more modules (including a controllable module and/or an uncontrollable module) of the software. Specifically, the determining device 410 may determine whether the symbols defined by each controllable module in the at least one controllable module are shared symbols by analyzing whether the symbols defined by the each controllable module are used by the each controllable module and two or more of other modules (including controllable modules and/or uncontrollable modules) invoked by the each controllable module. The determining device 410 can analyze usage status of the symbols defined by each controllable module, i.e., determine whether the symbols defined by each controllable module are used by the each controllable module and two or more of the other modules invoked by the each controllable module, by performing the IPA on the each controllable module and the other modules invoked by the each controllable module. The method for executing the IPA by the determining device 410 is known in the art, and a description thereof is omitted here.

The generating device 420 can generate a symbol use file indicating the shared symbol defined by the at least one controllable module, i.e., the total symbol use file described above. Besides indication of the shared symbol defined by the at least one controllable module, the total symbol use file can comprise information indicating the controllable module which defines the shared symbol and information indicating the modules which uses the symbol. The generating device 420 can generate the total symbol use file in the manner described above with respect to FIG. 1, and a detailed description thereof is omitted here to avoid repetition. The total symbol use file may adopt any appropriate format, such as a table, a text file, etc.

The building device 430 can re-build the software based on the total symbol use file, so that a symbol table in a controllable module of the rebuilt software only contains the shared symbol indicated in the total symbol use file.

Figure 5:
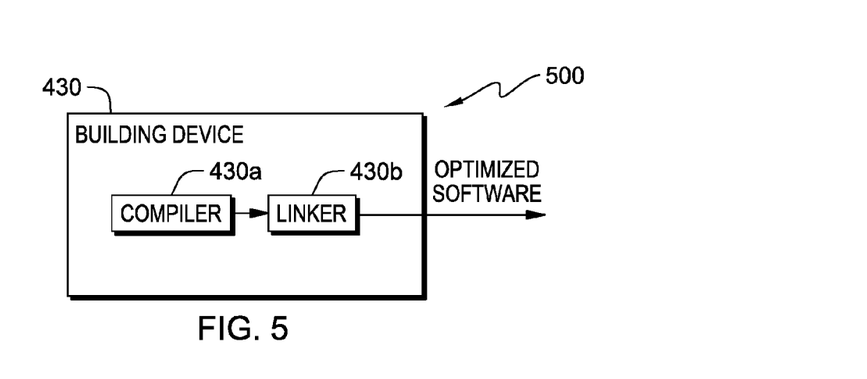
FIG. 5 shows a structural block diagram of a building device shown in FIG. 4.

FIG. 5 (device 500) shows a structure of the building device 430. As shown in FIG. 5, the building device 430 may include a compiler 430a and a linker 430b. The compiler 430a can re-compile a source file of each controllable module of the software to generate a corresponding object file, in which symbols (i.e., the internal symbols) in the each controllable module, other than the shared symbols indicated in the total symbol use file, are provided with an access mode quicker than that of the shared symbols. For example, when compiling the source files of the respective controllable modules of the software, the compiler 430a can inquire the total symbol use file to determine the shared symbols in the respective controllable modules, and then, in the object files generated by compiling, set a quick access mode for the internal symbols in the respective controllable module and set a conventional slow access mode for the shared symbols. The linker 430b can receive the optimized object files and the total symbol use file, inquire the total symbol use file to determine the shared symbols (and the internal symbols) in the respective controllable modules, and when re-linking the object files to generate controllable modules (executable files or shared libraries) in the rebuilt software which correspond to the above respective controllable modules respectively, hide the internal symbols in the symbol tables of the corresponding controllable modules, that is, do not generate the internal symbols into the symbol tables in the controllable modules of the rebuilt software, so that the symbol tables in the controllable modules contain only the shared symbols indicated in the total symbol use file.

Thus, the rebuilt software, instead of the original software, can be executed when necessary. It can be seen that by using the apparatus for optimizing the software according to the embodiment of the present disclosure, the internal symbols and the shared symbols in the software can be accurately identified to reduce the number of the symbols in the symbol tables, thereby reducing the time consumed to load and parse the symbol tables during the execution of the software (i.e., the rebuilt software), and improving the software execution efficiency. Further, as the internal symbols are hidden in the symbol tables of the respective controllable modules in the rebuilt software, implementation details of the software can be prevented from being exposed to the external, which improves security of the software.

Figure 6:
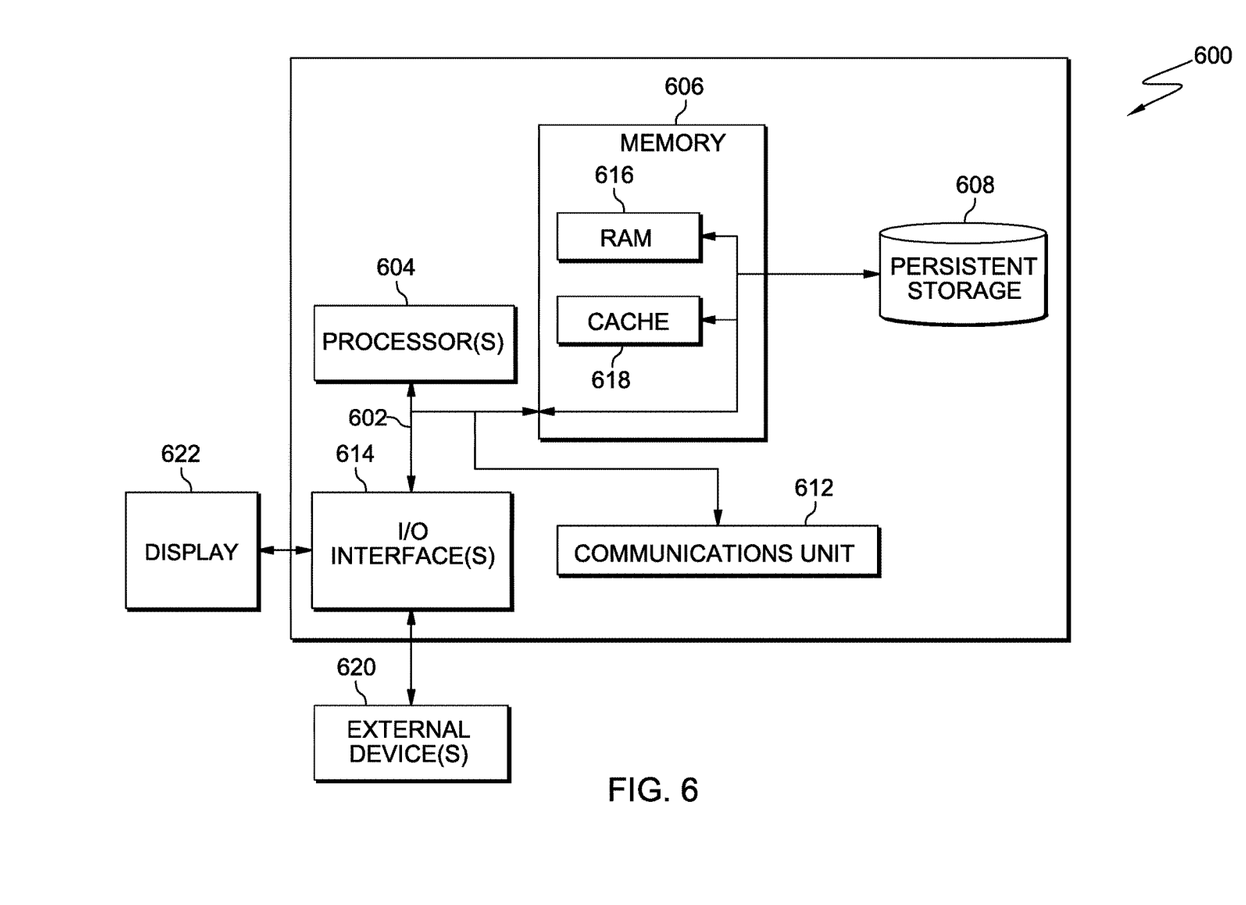
FIG. 6 shows an exemplary computer system/server which is applicable to implement the embodiments of the present disclosure.

Referring now to FIG. 6, in which an exemplary computer system/server 600 which is applicable to implement the embodiments of the present disclosure is shown. Computer system/server 600 is only illustrative and is not intended to suggest any limitation as to the scope of use or functionality of embodiments of the disclosure described herein.

As shown in FIG. 6, computer system/server 600 is shown in the form of a general-purpose computing device. The components of computer system/server 600 may include, but are not limited to, one or more processors or processing units 604, a system memory 606, and a bus 602 that couples various system components including system memory 606 to processor 604.

Bus 602 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 600 typically includes a variety of computer system readable media. Such media may be any available media that is accessible by computer system/server 600, and it includes both volatile and non-volatile media, removable and non-removable media.

System memory 606 can include computer system readable media in the form of volatile memory, such as random access memory (RAM) 616 and/or cache memory 618. Computer system/server 600 may further include other removable/non-removable, volatile/non-volatile computer system storage media. By way of example only, storage system 608 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 602 by one or more data media interfaces. As will be further depicted and described below, memory 606 may include at least one program product having a set (e.g., at least one) of program modules that are configured to carry out the functions of embodiments of the disclosure.

A program/utility having a set (at least one) of program modules, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the disclosure as described herein.

Computer system/server 600 may also communicate with one or more external devices 620 such as a keyboard, a pointing device, a display 622, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 can communicate with one or more networks such as a local area network (LAN), a general wide area network (WAN), and/or a public network (e.g., the Internet) via communications unit 612. As depicted, communications unit 612 communicates with the other components of computer system/server 600 via bus 602. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing software, including a plurality of modules which include at least one controllable module, the method comprising:

determining a shared symbol defined by the at least one controllable module, the shared symbol being a symbol used by two or more modules of software;

generating a symbol use file indicating the shared symbol defined by the at least one controllable module;

generating an export file indicating a label for the shared symbol;

merging the export file with the symbol use file according to a predetermined merging rule, wherein an access mode for the shared symbol is determined in accordance with the label; and rebuilding the software based on the symbol use file such that a symbol table in a controllable module of the rebuilt software only contains the shared symbol indicated in the symbol use file, wherein the rebuilding the software includes:

re-compiling a source file of each controllable module in the at least one controllable module to generate an object file in which a symbol in the each controllable module of the at least one controllable module, other than the shared symbol indicated in the symbol use file, is provided with an access mode quicker than that of the shared symbol; and re-linking the object file of the each controllable module of the at least one controllable module to generate a corresponding controllable module in the rebuilt software which corresponds to the each controllable module of the at least one controllable module.

2. The method of claim 1, wherein determining a shared symbol defined by the at least one controllable module includes:

analyzing, for each controllable module in the at least one controllable module, whether a symbol defined by the controllable module is used by the controllable module and two or more of modules invoked by the controllable module, to determine whether the symbol defined by the controllable module is the shared symbol.

3. The method of claim 2, wherein analyzing whether the symbol defined by each controllable module in the at least one controllable module is used by the each controllable module and two or more of modules invoked by the each controllable module is performed by an Interprocedural Analysis on the each controllable module and the modules invoked by the each controllable module.

4. The method of claim 1, wherein the at least one controllable module includes an executable file and a shared library developed by a developer of the software.

5. The method of claim 1, wherein the symbol use file includes information indicating the controllable module which defines the shared symbol and information indicating the modules which use the shared symbol.

* * * * *